United States Patent [19]

Passey et al.

[11] 4,342,077
[45] Jul. 27, 1982

[54] NUMERICAL CONTROL SERVO DRIVE CIRCUIT

[75] Inventors: Douglas A. Passey, Cleveland Heights; Ronald E. Jerva, Mentor On The Lake, both of Ohio

[73] Assignee: Allen-Bradley Company, Milwaukee, Wis.

[21] Appl. No.: 169,814

[22] Filed: Jul. 17, 1980

[51] Int. Cl.³ .............................................. G05B 19/18
[52] U.S. Cl. ............................. 364/183; 235/92 MP; 318/605; 318/608; 364/174; 364/167; 364/474
[58] Field of Search ............... 364/118, 474, 604, 721, 364/729, 730, 815, 167, 174, 183; 318/603, 605, 608, 660, 661; 235/92 MP; 340/347 SY

[56] References Cited

U.S. PATENT DOCUMENTS

| 3,686,487 | 8/1972 | Tripp | 318/603 X |
| 4,023,085 | 5/1977 | Bishop et al. | 318/608 |
| 4,109,185 | 8/1978 | Froyd et al. | 318/603 X |
| 4,134,106 | 1/1979 | Hungerford | 340/347 SY |
| 4,157,538 | 6/1979 | Simon et al. | 340/347 SY |
| 4,160,245 | 7/1979 | Scott | 340/347 SY |
| 4,204,257 | 5/1980 | Hungerford | 364/474 |
| 4,267,497 | 5/1981 | Cannon et al. | 318/661 |

Primary Examiner—Joseph F. Ruggiero
Attorney, Agent, or Firm—Quarles & Brady

[57] ABSTRACT

The resolver drive circuit on a numerical control system includes a microprocessor system which monitors the phase and amplitude of the sinusoidal wave forms applied to the resolver. Any changes in amplitude or phase shift of the applied wave forms due to such factors as time and temperature are automatically corrected by the microprocessor system. A highly accurate resolver position feedback system is thus formed with a minimal number of temperature sensitive components and a minimal number of required manual adjustments to analog circuitry.

9 Claims, 9 Drawing Figures

NUMERICAL CONTROL SERVO DRIVE CIRCUIT

BACKGROUND OF THE INVENTION

The field of the invention is numerical control systems, particularly, numerical control systems having servotype position controls which employ rotary or linear resolver devices for indicating the position of the machine member being controlled.

Numerical control systems such as those described in U.S. Pat. No. 4,038,533 and (U.S. Ser. No. 970,959), U.S. Pat. No. 4,228,495 generate a sequence of position commands which direct the motion of a movable machine member through a series of moves. To obtain accuracy, a position sensor is coupled to the movable machine member and it generates a feedback signal that indicates actual machine member position. The position feedback signal is combined with the position commands to produce an error signal that is indicative of the instantaneous difference between the commanded position and the actual position of the controlled member. The servo loop is driven by this error signal and the position accuracy of the numerical control system is dependent upon the accuracy of the position sensor.

Rotary and linear resolvers have been used for many years as position sensors on numerical control systems. The resolver is excited by two periodic wave forms and it generates a third wave form which indicates the relative position of its movable member. In one common technique the amplitude of the generated wave form indicates position, and in a second technique, the phase of the generated wave form indicates position. An implementation of the amplitude technique is disclosed in U.S. Pat. No. 3,686,487 and implementations of the phase technique are disclosed in U.S. Pat. Nos. 4,023,085, 4,109,185, 4,134,106 and 4,204,257.

The accuracy of resolver position sensors is in large part a function of the accuracy of the periodic wave forms applied to them. When using the phase technique for example, the two resolver stator windings are ideally driven with pure sine waves of equal amplitude and in exact quadrature. The output signal on the resolver's rotor will then be a sine wave of the same frequency, but phase shifted by the resolver shaft angle. Stated mathematically, if the voltages applied to the resolver stators are Eo sin wt and Eo sin $(wt-90°) = -$ Eo cos wt; then the output on the rotor is:

$E = (TR)Eo$ (sin wt cos $\theta$ - cos wt sin $\theta$) or
$E = (TR)$ (Eo) sin (wt - $\theta$)

where:
 (TR) = transformation ratio
 $\theta$ = resolver shaft angle
 w = angular frequency of stator wave forms Prior resolver systems using the phase technique determine the angle $\theta$ by detecting the crossover of the output sine wave and comparing it with the crossover of one of the input sine waves applied to the resolver.

The phase technique is accurate only if the applied wave forms are in exact quadrature, if the applied wave forms are of equal amplitude, and if there is no third harmonic distortion of the applied wave forms. If the applied stator wave forms are not exactly 90° apart in phase, but are otherwise pure sine waves of the same amplitude and frequency; then the rotor output is given by:

$E = (TR)Eo$ [sin wt cos $\theta$ - cos $(wt + \delta)$ sin $\theta$]

where:
 $\delta$ = a small error in quadrature in radians.

When the phase difference is determined by measuring the time difference between positive-going zero crossings, the resulting error in position feedback is as follows:

$\Delta\theta \simeq \delta/2(\cos 2\theta - 1)$ for small $\delta$ where:
 $\Delta\theta$ = error in resolver shaft angle
 $\delta$ = quadrature error in radians
 $\theta$ = resolver shaft angle If the applied wave forms are not equal in amplitude then the output wave form is:

$E = (TR)E_1$ sin wt Cos $\theta - (TR)E_2$ Cos wt sin $\theta$ where:
 (TR) = transformation ratio
 $E_1$ = peak value of one input wave form
 $E_2$ = peak value of other input wave form When phase difference is determined by measuring the time difference between positive-going zero crossings, the resulting error in position feedback is as follows:

$\Delta\theta \simeq \delta/2 \sin 2\theta$ for small $\delta$ where:
 $\Delta\theta$ = error in resolver shaft angle
 $\delta = E_2/E_1 - 1$
 $\theta$ = resolver shaft angle Using input wave forms that are distorted in shape will also introduce error by shifting the zero crossing of the output wave form. Introducing third harmonic distortion will, for example, result in the following output wave form:

$E = (TR)Eo$ [(sin wt + $\delta$ sin 3 wt) cos $\theta$ - (cos wt + $\delta$ cos 3 wt) sin $\theta$]
$E = (TR)Eo$ [sin (wt - $\theta$) + $\delta$ sin (3 wt - $\theta$)]

where:
 $\delta$ = fractional amplitude of in-phase third harmonic.

This harmonic distortion results in an error in resolver angle, $\Delta\theta$, as follows:

$\Delta\theta \simeq -\delta \sin 2\theta$ for small $\delta$

Attempts have been made in prior resolver systems to minimize inaccuracies, but these have not been entirely successful. The input wave forms can be accurately generated using digital techniques, but the wave forms are converted to analog form before application to the resolver. The digital to analog converters and associated power amplifiers needed to accurately make this conversion are expensive and require considerable temperature compensation circuitry and continued manual adjustment to maintain the two wave forms in quadrature and at equal amplitude. In addition, zero crossing detection circuitry must be extremely stable with respect to temperature induced voltage offset drifts and phase shifts. These requirements have rendered the phase technique impractical for use in high resolution, high accuracy numerical control applications.

SUMMARY OF THE INVENTION

The present invention relates to a circuit for accurately generating input wave forms to a position sensor of the type which generates an output wave form indicating the relative orientation of a movable element.

More specifically, the present invention includes means for generating a first position sensor input wave form, means for generating a second position sensor input wave form which is related to the first wave form by preselected criteria, processor means coupled to receive the first and second input wave forms and compare them against the preselected criteria, and means coupled to said processor means for altering one of said generated input wave forms to maintain the relationship of said input wave forms within said preselected criteria.

A general object of the invention is to accurately generate input wave forms for a resolver type position sensor. The two input wave forms are each digitally generated and applied to respective digital to analog converter circuits which drive the resolver input windings. These input wave forms are each separately applied to an analog multiplexer circuit which periodically couples the respective wave forms to a detector circuit that senses when the wave form passes through zero volts. A programmed microprocessor system couples to the detector circuit and it operates in response to the detected zero crossing of each wave form to determine the phase relationship of the two input wave forms. If they are not in quadrature, the microprocessor outputs data to the digital wave form generator to alter the phase relationship of the two input wave forms.

The relative magnitudes of the two input wave forms are also controlled by the microprocessor system. The two generated input wave forms are summed together and applied to another input on the analog multiplexer. When the two wave forms are of equal amplitude, this summed signal has a zero crossover which is phase displaced 45 degrees from the zero crossover of the input wave forms. When the summed signal is not properly phase displaced, the microprocessor system outputs a signal to one of the analog to digital converters to alter the relative amplitudes of the generated input wave forms.

Another general object of the invention is to reduce the number of adjustments and temperature compensated components in a high resolution resolver type position feedback system. Because the input wave forms are continuously monitored and their generation continuously controlled by the microprocessor system, temperature and time drift which plague prior art systems is automatically compensated without manual intervention. All corrective signals are generated by comparing signals applied through the same analog multiplexer and associated circuitry, and hence, any phase shift in this circuitry affects the compared signals equally.

Another object of the invention is to provide a high resolution position feedback system which performs other numerical control functions. The added cost of the microprocessor system is more than offset by the reduction in expensive temperature compensated analog circuitry. The microprocessor system is also available to perform other functions. Such functions may include the generation of a velocity signal from position feedback information, the performance of diagnostics (both on-line and off-line) and the coupling of data between the servo loop and the numerical control processor. In the latter case, the microprocessor system may also be used to modify position information to compensate for nonlinearities in the mechanical drive elements of the machine member being controlled by the numerical control system.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
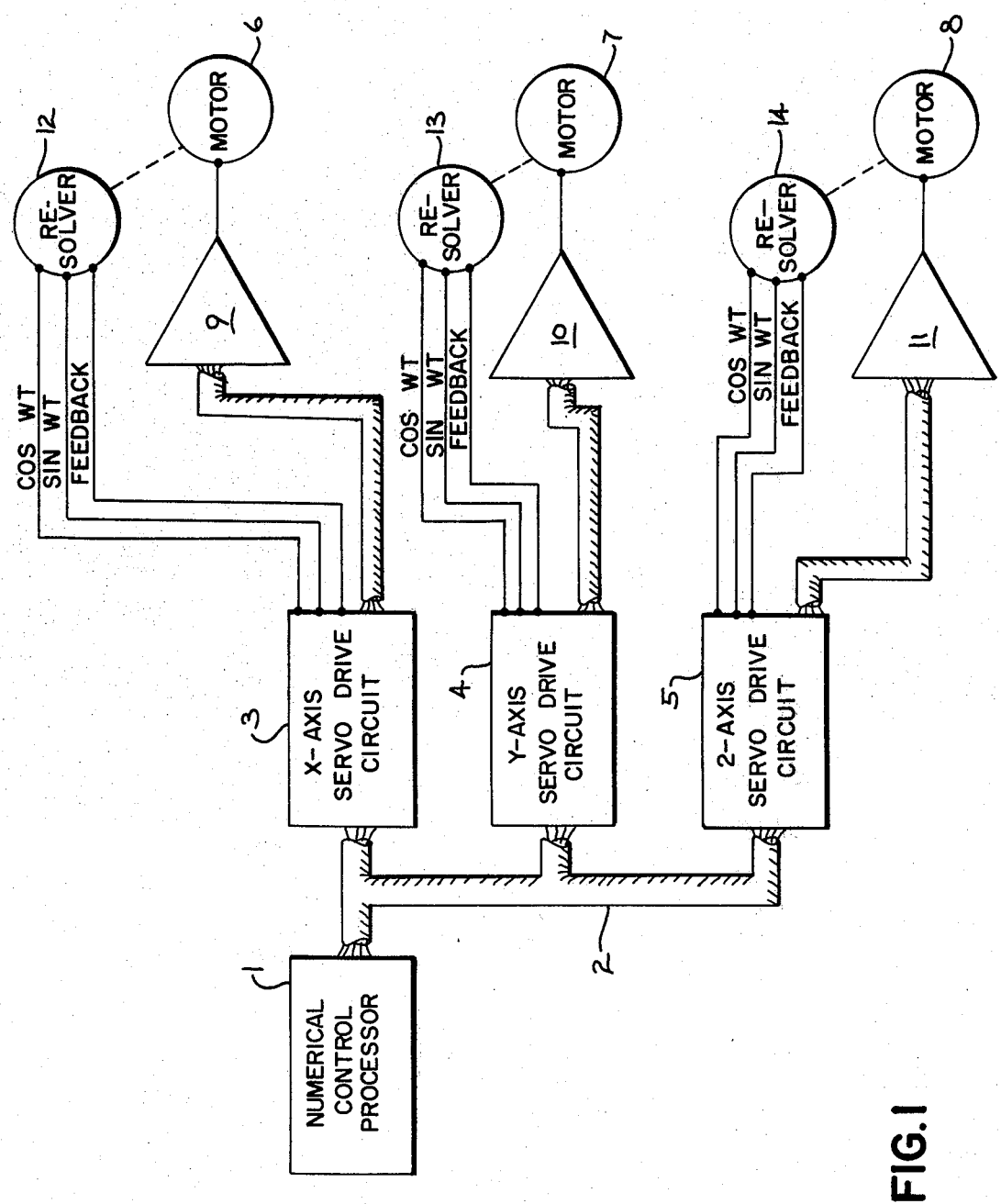
FIG. 1 is an electrical block diagram of a three-axis numerical control system which employs the present invention.

Referring particularly to FIG. 1, a three-axis numerical control system includes a numerical control processor 1 which is coupled through an I/O bus 2 to X-axis, Y-axis and Z-axis servo drive circuits 3–5. The numerical control processor 1 is described in detail in U.S. Pat. No. 4,038,533 and it operates to periodically input from each of the servo drive circuits 3–5 a 16-bit position feedback signal and to output a 12-bit position error signal that directs the motion of respective motors 6, 7 and 8 through respective servo amplifiers 9, 10 and 11. This exchange of data between the numerical control processor 1 and each servo drive circuit 3–5 occurs once every 10.24 milliseconds, and during each such 10.24 millisecond iteration, the servo drive circuits 3–5 receive and accumulate position feedback data from respective resolvers 12–14. During each iteration the numerical control processor 1 calculates a position command signal for each axis using piece part program input data. The position feedback data received from each servo drive circuit during the previous iteration is then subtracted from the position command signals to form the position error signals which are output to the servo drive circuits. The servo drive circuits 3–5 receive the position error signals through the I/O bus 2, convert them to analog signals, and couple them directly to the respective servo amplifiers 9–11.

The resolvers 12–14 are of the rotary type such as those sold as 11-BRW-300-B-60 and manufactured by HAROWE SERVO CONTROLS, INC. These resolvers have two stator windings which are driven by sinusoidal signals indicated in FIG. 1 as cos wt and sin wt. A sinusoidal feedback signal is generated by a winding carried by the rotor in each resolver 12–14, and the rotor is mechanically coupled to the machine being controlled by the motors 6–8. The motion of the machine is translated to rotation of the resolver rotor, which in turn is translated to a phase shift in the sinusoidal feedback signal which it generates. The change in phase of the feedback signal during an iteration period is thus indicative of the actual machine motion during that time period. Other resolver type position transducers may be employed, including those sold under the registered trademark Inductosyn.

Figure 2:
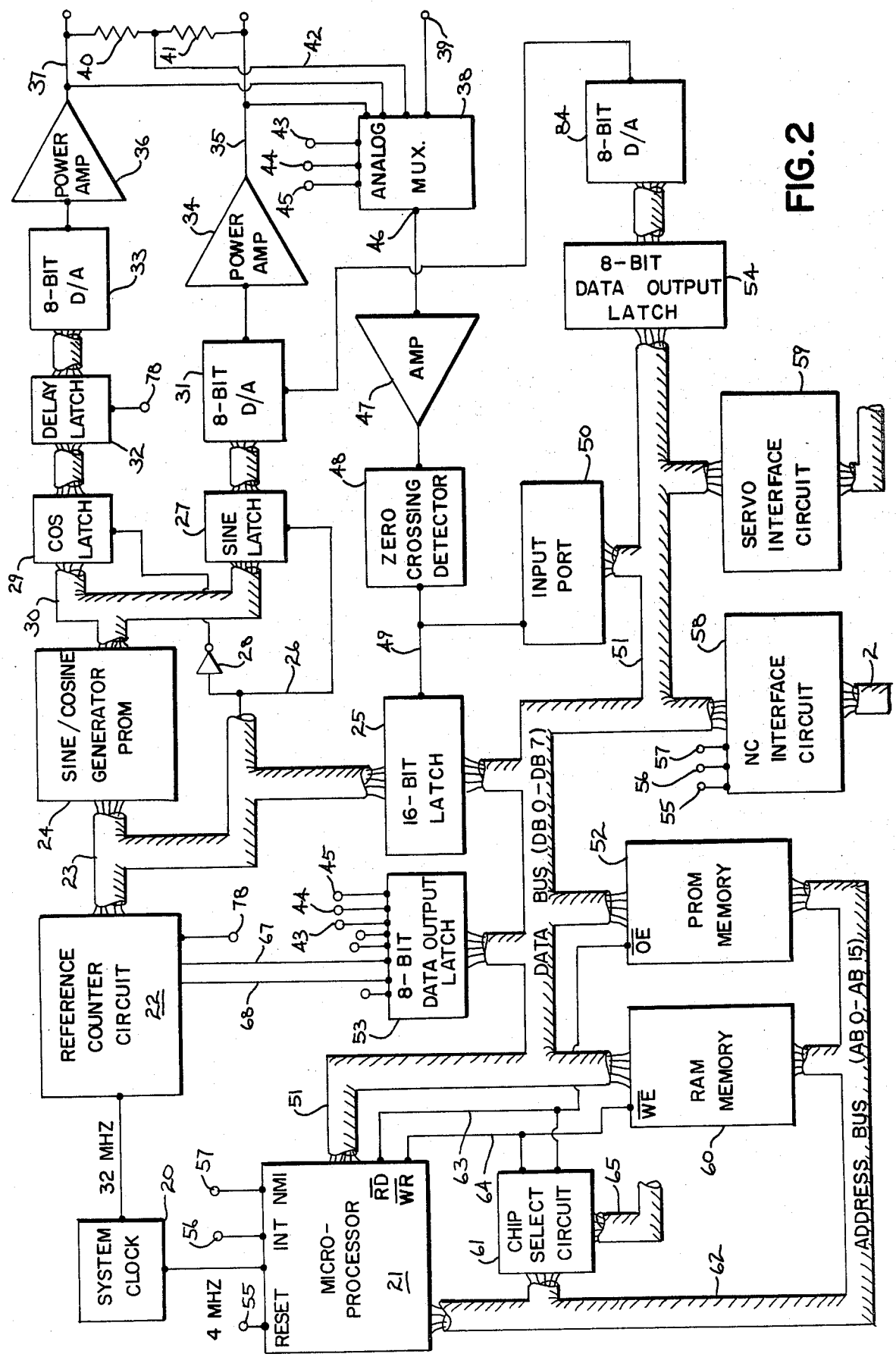
FIG. 2 is an electrical block diagram of a servo drive circuit which forms part of the system of FIG. 1.

Referring particularly to FIG. 2, the operation of each servo drive circuit 3–5 is synchronized by a system clock 20. The clock 20 generates a 4 megahertz signal which is applied to an 8-bit microprocessor 21 and it generates a 32 megahertz clock signal which is applied to a counter circuit 22. As will be described in more detail hereinafter, the counter circuit 22 includes a 15-bit counter which is continuously incremented by the 32 megahertz clock signal. The ten most significant digit outputs of this counter are coupled through a bus 23 to the address terminals on a sine/cosine generator PROM 24 and all 15 counter bits are applied to the inputs of a 16-bit latch circuit 25. The least significant digit coupled to PROM 24 is also coupled through a line 26 to the clock terminal of an 8-bit sine latch 27 and through an inverter gate 28 to the clock terminal on a cosine latch 29.

The sine/cosine generator PROM 24 stores in digital form a sine wave and a cosine wave. Digital data which defines each wave form is stored on alternate lines of the PROM 24 and as the counter circuit 22 sequentially addresses each line, the data is read out through an 8-bit bus 30 and alternately latched in the sine latch 27 and the cosine latch 29. The digital data representing the sine wave is thus sequentially applied to an 8-bit digital to analog converter circuit 31 and the digitized cosine wave form is applied through an 8-bit delay latch 32 to a second 8-bit digital to analog converter circuit 33. The output of the 8-bit digital to analog converter circuit 31 drives a power amplifier 34, and it produces the sine wave form $E_1 \sin wt$ on a line 35 which connects directly to the resolver. Similarly, the output of the 8-bit digital to analog converter circuit 33 drives a power amplifier 36 which generates the cosine input wave form $-E_2 \cos wt$ to the resolver on a line 37.

The position feedback signal from the resolver as well as the input wave forms are applied to respective inputs on an analog multiplexer circuit 38. The analog position feedback signal is applied through a line 39 and the input wave forms $E_1 \sin wt$ and $-E_2 \cos wt$ are applied to the analog multiplexer through the lines 35 and 37. In addition, a pair of balanced resistors 40 and 41 are connected across the lines 35 and 37 to form a summing point which connects to another input on the analog multiplexer 38 through a line 42. Three control lines 43–45 enable the analog multiplexer 38 and select one of the four signals applied to its input.

The selected input wave form from the multiplexer 38 is generated at an output terminal 46 and applied through an amplifier 47 to a zero crossing detector circuit 48. As will be described in more detail hereinafter, when the selected wave form passes through zero volts in the positive direction, the zero crossing detector circuit 48 generates a logic high voltage on a line 49 which is applied to both an input port 50 and to the clock terminal on the 16-bit latch 25. Thus, when the zero crossing occurs, the output of the counter circuit 22 is latched.

The output of the counter circuit 22 serves as a reference count which is used to measure the phase relationship of the wave forms applied to the analog multiplexer circuit 38. The count stored in the 16-bit latch 25 when the zero crossing occurs on one of the wave forms is compared with the count stored in the 16-bit latch 25 during the zero crossing of another of the wave forms. For example, in the preferred embodiment 20,000 counts occur during a complete cycle of the generated sine or cosine wave forms. Thus, a count difference of 5,000 indicates that the two wave forms being compared are 90 degrees out of phase. In this manner, the phase relationship of the four wave forms applied to the analog multiplexer circuit 38 can be measured.

The 16-bit latch circuit 25 and the input port 50 connect to an 8-bit data bus 51 which is driven by the microprocessor 21. The microprocessor 21 operates in response to instructions stored in a programmable read-only memory 52 to input data from the port 50 and the 16-bit latch 25 and to output control data to a first 8-bit data output latch 53 and a second 8-bit data output latch 54. In response to interrupt signals applied to the microprocessor 21 through lines 55, 56 or 57, the microprocessor system inputs position error commands from the numerical control processor 1 through an NC interface circuit 58. As will be described in more detail hereinafter, the microprocessor system also outputs position feedback data to the numerical control processor 1 through the NC interface circuit 58 and it outputs position error signals to the servo amplifiers through a servo interface circuit 59.

The various circuits which connect to the data bus 51, including a random access memory 60 are enabled by a chip select circuit 61. The chip select circuit 61 decodes addresses generated on a bus 62 by the microprocessor 21. The chip select circuit 61 is further qualified by signals on a read control line 63 and a write control line 64 and in response to these, enabling signals are generated to a control bus 65. The addresses which enable the various microprocessor system elements are listed in Table A.

TABLE A

| HEXADECIMAL ADDRESS | RD | WR | DEVICE ENABLED |
|---|---|---|---|
| 0000 to 0FFF | | | PROM MEMORY 52 |
| 1000 to 13FF | | | RAM MEMORY 60 |
| 1800 | X | | 16-Bit Latch 25 (LSB) |
| 1801 | X | | 16-Bit Latch 25 (MSB) |
| 1800 | | X | Servo interface 59 (LSB) |
| 1801 | | X | Servo interface 59 (MSB) |
| 1802 | X | | NC interface input (LSB) |
| 1803 | X | | NC interface input (MSB) |
| 1802 | | X | NC interface output (LSB) |
| 1803 | | X | NC interface output (MSB) |
| 1804 | X | | Input port 50 |
| 1804 | | X | Data Output Latch 53 |
| 1806 | | X | Data Output Latch 54 |

Figure 3:
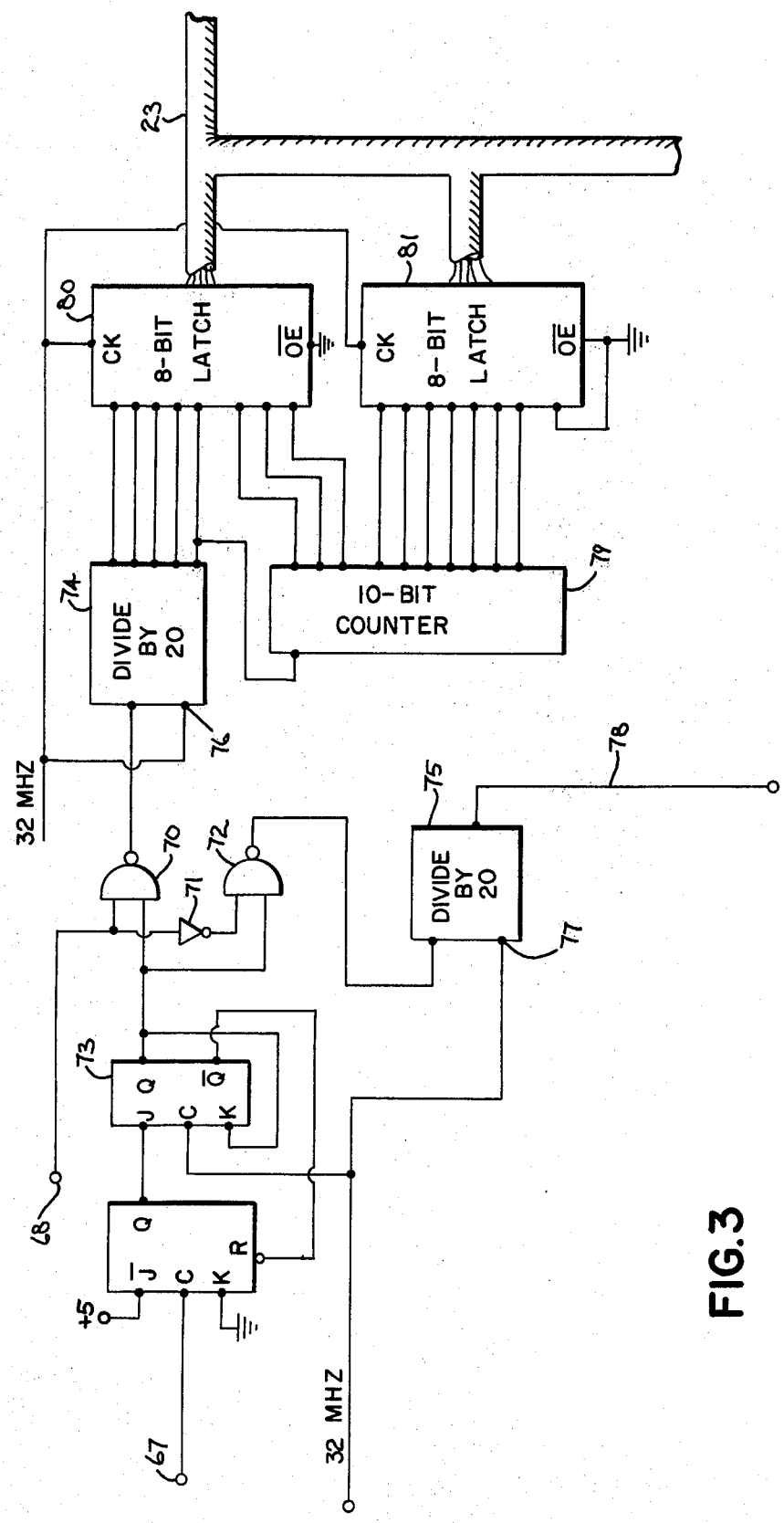
FIG. 3 is a circuit diagram of a counter circuit which forms part of the circuit of FIG. 2.

Referring particularly to FIGS. 2 and 3, the microprocessor system controls the phase relationship of the sinusoidal wave forms applied to the resolver through a pair of control lines 67 and 68. These control lines 67 and 68 connect two outputs of the latch 53 to the counter circuit 22. The control line 67 is connected to the clock terminal on a first JK flip-flop 69 in the counter circuit 22 and the control line 68 is applied directly to the input of a first NAND gate 70 and through an inverter 71 to the input of a second NAND gate 72. When a logic high phase correction pulse is generated on the control line 67 the flip-flop 69 is set and a second flip-flop 73 is then set by the next 32 megahertz clock pulse. The Q output of the flip-flop 73 connects to second inputs on the NAND gates 70 and 72 and one of their output terminals is driven low by the logic state of the control line 68.

The NAND gates 70 and 72 connect to inputs on respective divide by twenty circuits 74 and 75. When the NAND gate outputs are at a logic high voltage, the divide by twenty circuits 74 and 75 count 32 megahertz clock pulses applied to clock terminals 76 and 77. On the other hand, when either NAND gate output is driven low, the 32 megahertz clock pulses apply to the respective divide by twenty circuit 74 or 75 are not counted. The output of the divide by twenty circuit 79 connects through a line 78 to the 8-bit delay latch 32 and the most significant digit output of the divide by twenty circuit 74 connects to the input of a 10-bit counter 79. The ten output terminals on the counter 79 drive the sine/cosine generator PROM 24 and these outputs along with the five output terminals on the divide by twenty circuit 74 form the 15-bit reference count which is coupled to the 16-bit latch circuit 25. A pair of 8-bit latches 80 and 81 connect the divide by twenty outputs and the 10-bit counter outputs to the bus 23.

When a phase correction pulse is generated on the control line 67 and the control line 68 is at a logic high voltage, the 15-bit reference counter is not incremented by the next 32 megahertz clock pulse. As a result, the sine wave form and the cosine wave form generated by the PROM 24 are both delayed 1/20,000 of a cycle. However, the divide by twenty circuit 75 is incremented one count with the result that the effective delay introduced by the delay latch 32 is reduced. As a result, therefore, the phase of the generated cosine wave form is unaffected by the phase correction pulse and the sine wave form is delayed. The opposite result occurs when the control line 68 is at a logic low voltage and a phase correction pulse is received through the control line 67. In this case, one count is skipped by the divide by twenty circuit 75 with the result that the enabling signal generated to the delay latch 32 through the control line 78 is delayed 1/20,000 of a cycle. The reference counter is unaffected and the net result is to cause a delay of the cosine wave form with respect to the sine wave form. It should be apparent to those skilled in the art that by generating phase correction pulses on the control line 67 and controlling the logic state of the control line 68, the phase relationship of the generated sine wave form and cosine wave form can be controlled very accurately.

Figure 4:
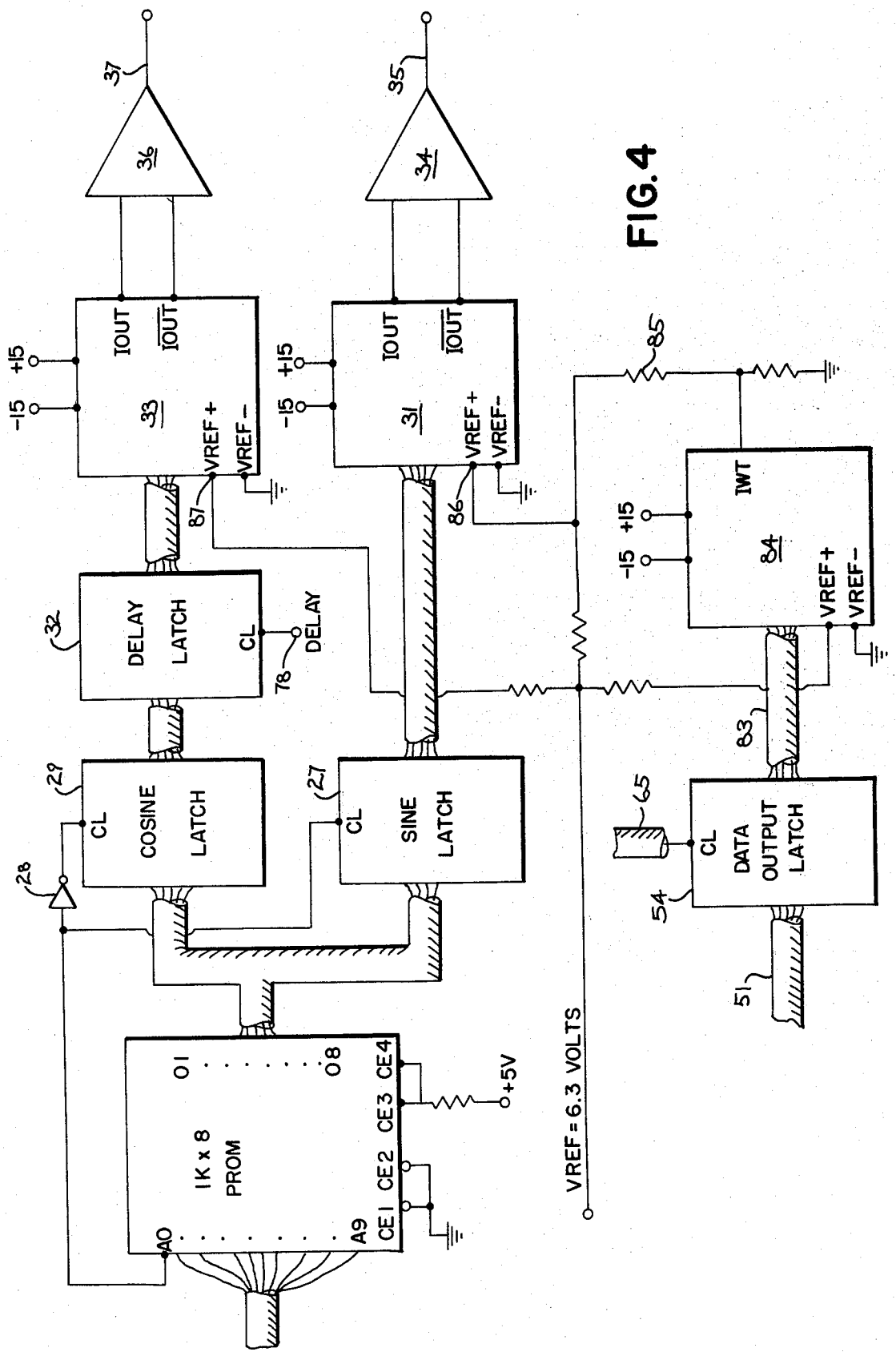
FIG. 4 is a circuit diagram of portions of the servo drive circuit of FIG. 2 which relate to the generation of the input wave forms.

Referring to FIGS. 2 and 4, the relative magnitudes of the sine wave form and cosine wave form are controlled by data which is output through the 8-bit data output latch 54. The inputs of the data latch 54 connect to the eight leads in the data bus 51 and when the data output latch 54 is clocked, an 8-bit binary number is latched and output through a bus 83 to the inputs of an 8-bit digital to analog converter circuit 84. The digital number is converted to an analog output signal which is generated through a coupling resistor 85 to the positive reference voltage terminal on the sine wave digital to analog converter circuit 31. Both the sine wave digital to analog converter 31 and the cosine digital to analog converter circuit 33 are regulated by a common 6.3 volt reference voltage which applies equal currents to their VREF+ terminals 86 and 87. the output of the compensating digital to analog circuit 84 is summed with the reference current applied to the input 86 of the sine wave digital to analog converter circuit 31 and the magnitude of this compensating signal directly affects the magnitude of the sine wave which is output by the digital to analog converter circuit 31. The relative magnitudes of the generated sine wave and cosine wave can therefore be directly controlled by the microprocessor system.

Figure 5:
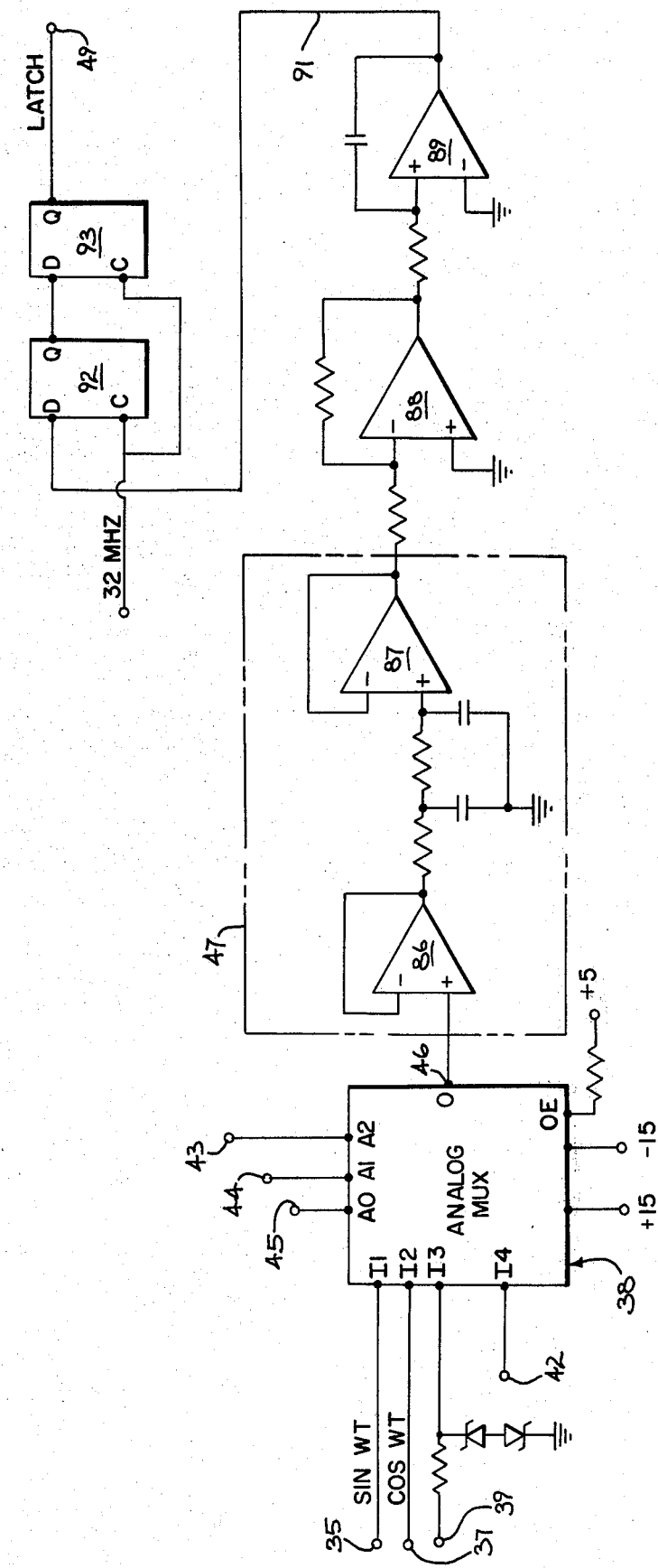
FIG. 5 is a circuit diagram of portions of the servo drive circuit of FIG. 2 which relate to the detection of wave form zero crossing.

Referring particularly to FIGS. 2 and 5, the microprocessor system monitors relative amplitudes and phase of the generated sine and cosine wave forms using the identical circuitry employed to determine the phase of the position feedback signal. This is accomplished by applying the various wave forms to respective inputs on the analog multiplexer circuit 38 and selecting one of them by applying appropriate control signals to the control lines 43–45. The control lines 43–45 are connected to the output of the data output latch 53, and hence, the operation of the analog multiplexer circuit 38 is controlled by the microprocessor system.

The wave form selected for analysis is generated at the output 46 of the analog multiplexer 38 and is applied to the input of the amplifier circuit 47. The amplifier circuit 47 is comprised of a pair of operational amplifiers 86 and 87 which are interconnected to provide a buffer and low pass filter. The output of the filter 47 is applied to the zero crossing detector circuit 48 which includes an operational amplifier 88 and a comparator 89. The operational amplifier 88 is interconnected to amplify the incoming signal by ten and the comparator 89 is connected to generate a logic high voltage at its output 91 when the wave form passes through zero volts in the positive going direction. The output 91 is coupled to the D input of a D-type flip-flop 92, which in turn drives a second D-type flip-flop 93. The flip-flops 92 and 93 are clocked by the 32 megahertz clock signal and the Q output of the flip-flop 93 drives the line 49 which enables the 16-bit latch 25 at each detected zero crossing. The line 49 also connects to the input port 50, and as will be explained in more detail hereinafter, the microprocessor system periodically examines the logic state of this line to determine when a positive going zero crossing has occurred. The system then reads the contents of the 16-bit latch 25 to obtain the precise zero crossing point.

Standard integrated circuits are employed throughout the servo drive circuit and reference is made to Appendix A for a detailed description of each device employed in the above described circuits.

Figure 6A:
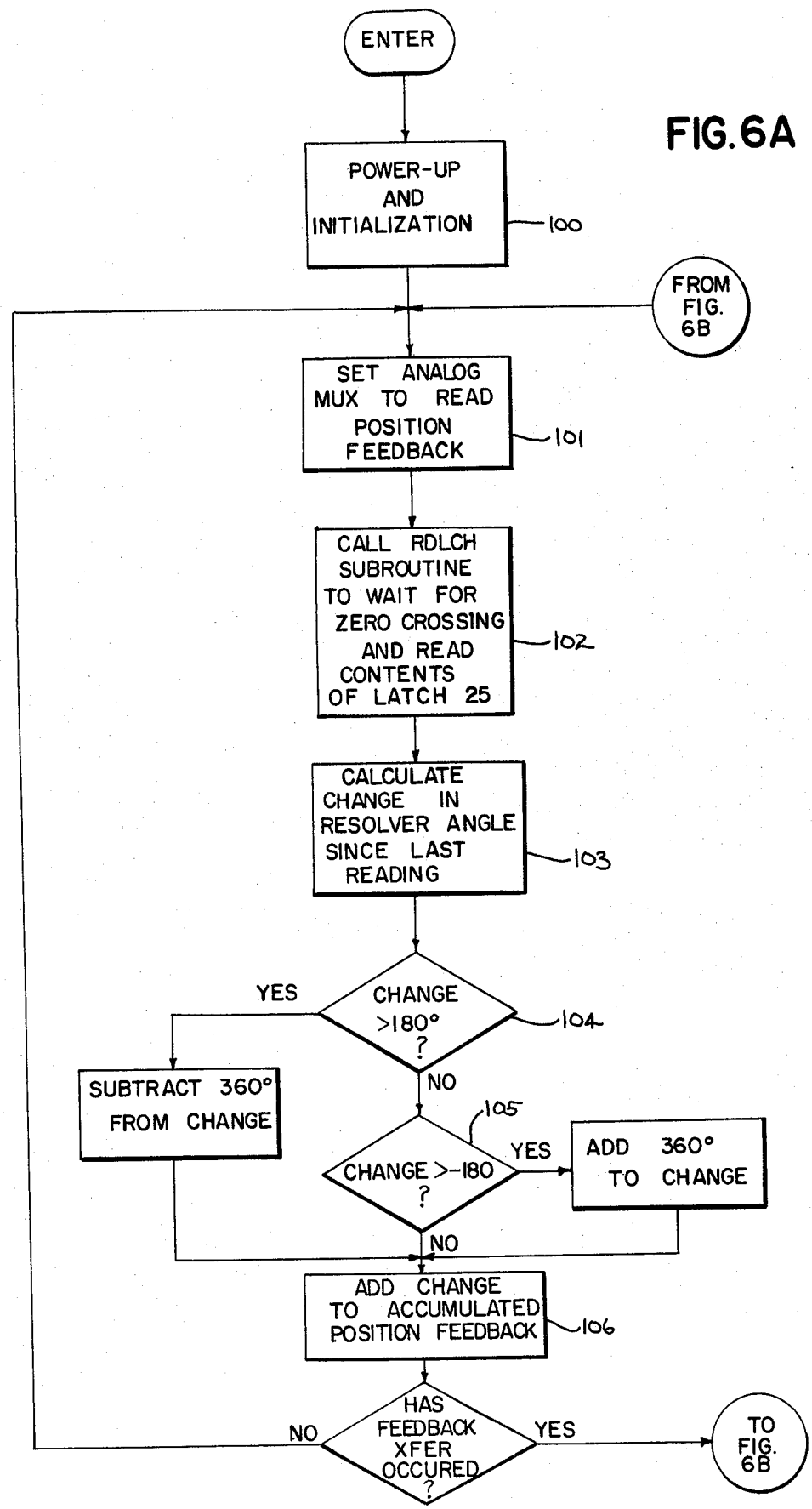
FIGS. 6A and 6B are a flow chart of the main routine which forms part of the servo drive circuit of FIG. 2, and FIGS. 7A and 7B are flow charts of interrupt service routines which form part of the servo drive circuit of FIG. 2.
Figure 6B:
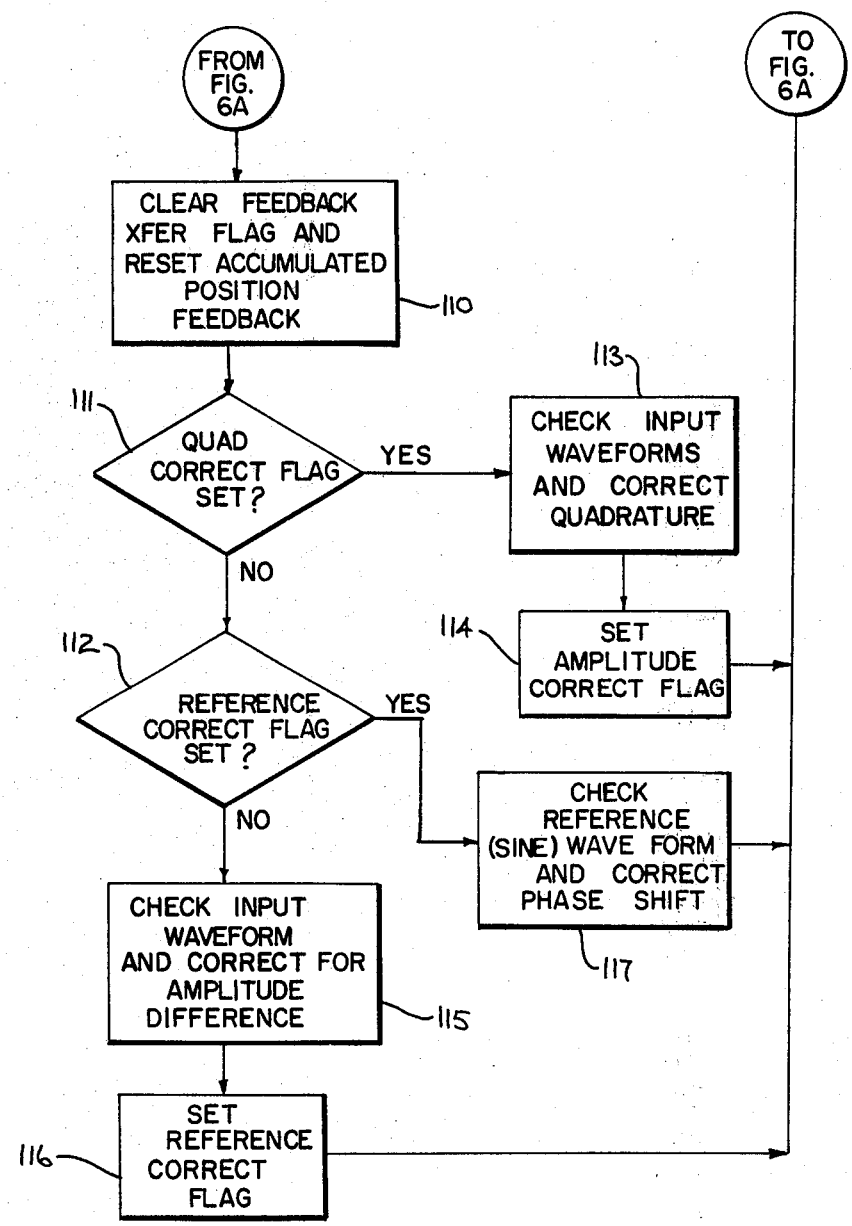
Figure 7A:
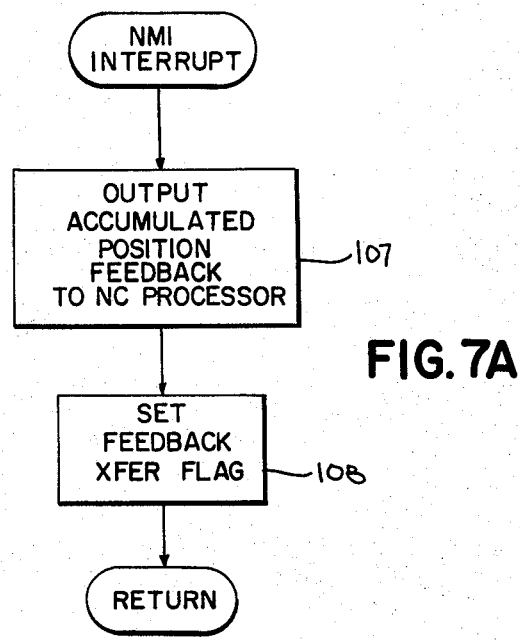
Figure 7B:
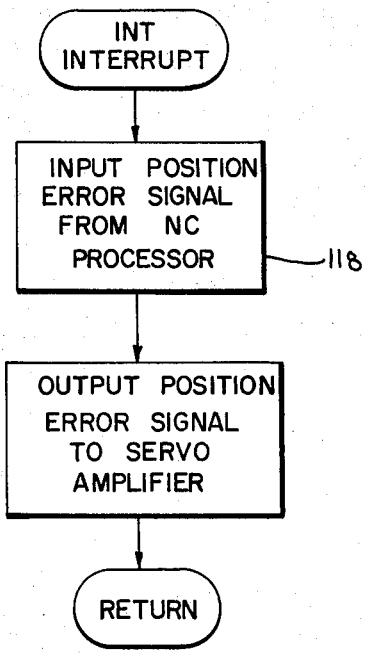

The microprocessor system operates under the direction of machine instructions which are stored in the PROM memory 52. FIGS. 6A and 6B show a flow chart of a main program which is continuously executed when the system is powered up, and FIGS. 7A and 7B are flow charts of interrupt service routines which are executed every 10.24 milliseconds in response to interrupts generated by the numerical control processor 1. An assembly language listing of these programs is provided in Appendix B and reference is made to the listing for a detailed description of the software.

Referring to FIGS. 2 and 6, when the system is powered up a number of instructions indicated by process block 100 are executed to initialize the system. Instructions indicated by process block 101 are then executed to set the multiplexer 38 to input the position feedback wave form on the line 39. A subroutine indicated by process block 102 is then called to wait for the positive going zero crossing of the position feedback wave form. When this event occurs, the output of the reference counter 22 is clocked into the 16-bit latch 25 and this "reference count" is read into the microprocessor accumulator. A set of instructions indicated by process block 103 are then executed to determine the change in the reference count since the last zero crossing reading, and after adjustments in the resulting change ($\Delta\theta$) which may be required as determined at decision blocks 104 and 105, the number is added to an accumulated position feedback number at process block 106.

The microprocessor system continues to monitor the zero crossing of the position feedback wave form and add to the accumulated position feedback number until the numerical control processor 1 generates an NMI interrupt. This occurs every 10.24 milliseconds, and in response, the system is vectored to an NMI interrupt service routine. As shown in FIG. 7A, this service routine includes instructions indicated by process block 107 which output the accumulated position feedback number to the numerical control processor through the NC interface circuit 58. Another instruction indicated by process block 108 is then executed to set a feedback transfer flag to indicate that the transfer has occurred and the system returns to the main routine.

Referring again to FIGS. 6A and 6B, the occurrence of a position feedback transfer is detected at decision block 109, at which point the main routine branches out of its main loop. The feedback transfer flag is then cleared and the accumulated position feedback is reset by a set of instructions indicated by process block 110. A pair of flags are then tested as indicated by decision blocks 111 and 112 to determine which of three wave form correction subroutines is to be executed. If a quad correct flag is set, a subroutine indicated by process block 113 is executed to check the zero crossing of both the sine input wave form and the cosine input wave form. If the input wave forms are not in quadrature, corrective pulses are output to the reference counter circuit 22 to retard one of the input wave forms. After the wave forms have been brought into quadrature an amplitude correct flag is set at process block 114 and the system returns to the main loop.

After the next NMI interrupt has been serviced and the feedback transfer flag set, the system branches at decision block 112 to a subroutine indicated by process block 115 in FIG. 6B. This subroutine executes instructions which check the zero crossing of the wave form created by summing the sine and cosine wave forms. This zero crossing should be phase displaced 45 degrees with respect to the sine wave form, or in other words, the difference in reference counter readings should be $\frac{1}{8}$ (20,000)=2500 counts if the two input wave forms are of equal amplitude. A corrective value is calculated if they are not equal and this is output to the 8-bit data output latch 54 to alter the amplitude of the sine wave form. As indicated by process block 116 when the amplitude correction is complete a reference correct flag is set and the system loops back to continue updating the accumulated position feedback number.

After the next NMI interrupt is serviced the system branches at decision block 112 to execute a subroutine indicated by process block 117. A set of instructions in this subroutine checks the zero crossing point of the sine input wave form, and the reference counter is read at this crossing. This number is compared with that obtained during the previous correction and the difference, if any, represents a phase drift in the reference (sine) wave form. A correction is made to the accumulated position feedback number to account for any reference wave form drift and the system then returns to the main loop.

One of the three correction subroutines is thus executed each 10.24 milliseconds following an NMI interrupt. Each correction is made once every 30.72 milliseconds to provide virtually continuous adjustment to the phase and amplitude of the wave forms applied to the position feedback device. In addition, it should be apparent that other corrective measures could also be added to the system, including for example, on-line diagnostic testing of the servo loop hardware and correction for known non-linearities in the machine drive mechanism.

Referring particularly to FIG. 7B, once every 10.24 milliseconds an INT interrupt is generated by the numerical control processor 1. In response, the system is vectored to an interrupt service routine which executes instructions indicated by process blocks 118 and 119. The position error signal generated by the numerical control processor 1 is input through the NC interface circuit 58 and a digital position signal is promptly output to the servo interface circuit 59. The servo interface circuit 59 contains latches which hold the digital position signal and apply it to the input of a digital to analog converter circuit which drives the servo amplifier.

APPENDIX A

| COMPONENT | DESCRIPTION |
|---|---|
| microprocessor 21 | Z80A manufactured by Zilog, Inc. |
| Latches 80 and 81 | Octal D-type latch SN74S374N manufactured by Texas Instruments, Inc. |
| PROM memory 52 | 1KX8 - manufactured by Signetics, Inc. |
| chip select circuit 61 | Two Decoder/Demultiplexers SN74LS138N manufactured by Texas Instruments, Inc. |
| 8-bit D/A converters 31, 33 and 84 | |
| input port 50 | 3-state octal buffers SN74LS244N manufactured by Texas Instruments, Inc. |
| power amplifiers 34 and 36 | UA759 manufactured by Fairchild Semiconductor, Inc. |
| analog multiplexer 38 | manufactured by National Semiconductor, Inc. |
| Counters 74, 75 and 79 | Synchronous 4-bit counters SN74S163N manufactured by Texas Instruments, Inc. |
| Latches 25, 27, 29, 32, 53 and 54 | Octal D-type flip-flop SN74LS273 manufactured by Texas Instruments, Inc. |
| Sine/cosine PROM 24 | 1KX8 manufactured by Signetics, Inc. |
| operational amplifiers 86–89 | |
| RAM 60 | 1KX4 static ram SY2114-2 manufactured by Signetics, Inc. |

APPENDIX B

MAIN ROUTINE

```
;
ORG     90H
START   LD IY,0000H     BEGIN UTILIZATION AFTER
        LD (IOLCH),IY   POWER UP
```

APPENDIX B-continued

```
               LD HL,7FFFH
               LD (LATCH),HL
               XOR A
               LD (FLAG),A
               INC A
               LD (CORRCT),A
               LD A,80H
               LD (AMPDAC),A
               LD (AMP1MG),A
GETSW          LD BC,0000
               LD HL,CONTRL
READSW         LD (HL),B
               LD A,(HL)
               AND 02
               JR NZ,NOSET
               SCF
NOSET          RR C
               INC B
               LD A,B
               CP 08
               JR NZ,READSW
               LD A,C
               AND 07
               RLCA
               RLCA
               LD B,A
               LD A,32D
               SUB B
               LD B,A
               LD (MOD),A
               LD HL,0000
               LD DE,500D
ADD            ADD HL,DE
               DEC B
               JR NZ,ADD
               LD (POSHAF),HL
               EX DE,HL
               XOR A
               LD H,A
               LD L,A
               SBC HL,DE
               LD (NEGHAF),HL
               XOR A
               LD H,A
               LD L,A
               RR D
               RR E
               SBC HL,DE
               LD (QUART),HL
               XOR A
               RR D
               RR E
               EX DE,HL
               LD (EIGHT),HL
               LD B,00
CORECT         CALL RDLCH
               LD (LSTREF),HL
               CALL QUADCR
               CALL QUADCR
               CALL QUADCR
               CALL AMPCOR
               CALL AMPCOR
               CALL AMPCOR
               LD B,02H
               CALL RDLCH
               LD (LSTFBK),HL
               LD HL,(IOLCH)
               IM 1
               EI              END OF INITIALIZATION
;
FDBCK          LD B,02H        ;SET MUX 38 TO INPUT
                               POSITION FEEDBACK WAVEFORM
               CALL RDLCH      ;DETECT CROSSOVER AND CALCULATE
                               CURRENT RESOLVER ANGLE, X(N).
               EX DE,HL
               LD HL,(LSTFBK)  ;GET LAST RESOLVER ANGLE, X(N − 1)
               EX DE,HL
               LD (LSTFBK),HL  ;STORE CURRENT FEEDBACK
               XOR A           ;DIFFX = X(N) − X(N − 1)
               SBC HL,DE
               JR Z,FLGTST     ;IF ZERO, DON'T MODIFY TOTALX
               LD B,H          ;SAVE DIFFX IN BC
```

APPENDIX B-continued

|       |              |                                                      |
|-------|--------------|------------------------------------------------------|
|       | LD C,L       |                                                      |
|       | JR C,NEGX    | ;IF DIFFX NEGATIVE, GO TO NEGX                       |
|       | EX DE,HL     |                                                      |
| POSX  | LD HL,(NEGHAF) | ;VALUE OF NEGATIVE 180 DEGREES TO HL               |
|       | EX DE,HL     |                                                      |
|       | ADD HL,DE    | ;DIFFX − 180 DEGREES TO HL                           |
|       | JR NC, XOK   | ;JUMP IF DIFFX LESS THAN 180 DEGREES                 |
|       | ADD HL,DE    | ;DIFFX − 360 DEGREES TO HL                           |
|       | JR ADJX      |                                                      |
| NEGX  | XOR A        | ;DIFFX TO − DIFFX CONVERSION                         |
|       | LD H,A       |                                                      |
|       | LD L,A       |                                                      |
|       | SBC HL,BC    |                                                      |
|       | EX DE,HL     | ;−DIFFX NOW IN DE                                    |
|       | LD HL,(NEGHAF) | ;GET VALUE OF −180 DEGREES                         |
|       | EX DE,HL     |                                                      |
|       | ADD HL,DE    | ;−DIFFX − 180 DEGREES                                |
|       | JR NC,XOK    | ;IF DIFFX LESS THAN NEG 180 DEGREES, JUMP            |
|       | ADD HL,DE    | ;−DIFFX − 360 DEGREES                                |
|       | EX DE,HL     |                                                      |
|       | XOR A        | ;(−DIFFX −360 DEGREES) CONVERTED                     |
|       | LD H,A       | ;TO DIFFX + 360 DEGREES                              |
|       | LD L,A       |                                                      |
|       | SBC HL,DE    |                                                      |
| ADJX  | LD B,H       | ;ADJUSTED DIFFX TO BC                                |
|       | LD C,L       |                                                      |
| XOK   | ADD IY,BC    | ;UPDATE ACCUMULATED POSITION FEEDBACK(NEW TOTALX = OLD TOTALX + ADJUST DIFFX) |
| FLGTST| LD A, (FLAG) | ;IF TRANS, FDBACK, INTR OCURRED, CONTINUE;           |
|       | RRA          | ;ELSE, JUMP TO BEGINNING OF FEEDBACK                 |
|       | JR NC,FDBCK  | ;PROGRAM TO CONTINUE MONITORING POSITION FEEDBACK    |
| FBKCHK| XOR A        | ;CLEAR TRANSFER FEEDBACK FLAG                        |
|       | LD(FLAG),A   |                                                      |
|       | LD HL,(XIMAGE) | ;SUBTRACT TOTALX TRANSFERRED TO MAIN               |
|       | EX DE,HL     | ;PROCESSOR BY TRANFB INTERRUPT FROM THE              |
|       | PUSH IY      | ;CURRENT TOTALX IN THE IY REGISTER                   |
|       | POP HL       |                                                      |
|       | XOR A        |                                                      |
|       | SBC HL,DE    |                                                      |
|       | PUSH HL      |                                                      |
|       | POP IY       |                                                      |
|       | NOP          |                                                      |
|       | NOP          |                                                      |
|       | NOP          |                                                      |
|       | LD HL,CORRCT | ;CALL ONE OF THE THREE CORRECTION ROUTINES           |
|       | DEC (HL)     | ;IN ORDER                                            |
|       | JR Z,QUACAL  |                                                      |
|       | DEC (HL)     |                                                      |
|       | JR Z,AMPCAL  |                                                      |
|       | CALL REFCOR  | ;CALL REFERENCE CORRECTION ROUTINE                   |
|       | JP FDBCK     | ;JUMP BACK TO FEEDBACK ROUTINE                       |
| QUACAL| LD (HL),2    | ;SET AMPLITUDE CORRECT FLAG                          |
|       | CALL QUADCR  | ;CALL QUADRATURE CORRECTION ROUTINE                  |
|       | JP FDBCK     |                                                      |
| AMPCAL| LD (HL),3    | ;SET REFERENCE WAVEFORM CORRECT FLAG                 |
|       | CALL AMPCOR  | ;CALL AMPLITUDE CORRECTION ROUTINE                   |
|       | JR FDBCK     | ;RETURN TO FEEDBACK ROUTINE                          |

RDLCH SUBROUTINE

|       |              |                                                      |
|-------|--------------|------------------------------------------------------|
| RDLCH | LD A,(OUTIMG)| ;GET CURRENT STATE OF CONTROL OUTPUT LATCH 53        |
|       | AND 0F8H     | ;MASK OFF MUX SELECT BITS                            |
|       | OR B         | ;SET MUX SELECT BITS WITH CONTENTS OF B REGISTER     |
|       | LD (OUTIMG),A| ;SET NEW CONTROL OUTPUT IMAGE                        |
|       | LD HL,CONTRL | ;POINT TO CONTROL LATCHES                            |
|       | LD (HL),A    | ;OUTPUT MUX SELECT CODE TO LATCH 53                  |
|       | PUSH HL      | ;DELAY APPROXIMATELY 12 MICROSECONDS FOR             |

APPENDIX B-continued

|  |  |  |
|---|---|---|
|  | POP HL | ;ANALOG MUX TO SETTLE |
|  | PUSH HL |  |
|  | POP HL |  |
|  | LD C,0F8H | ;LOAD COUNTER FOR 2 MSEC TIKEOUT |
| HIGH | LD A,(HL) | ;WAIT FOR NEXT LOW TO HIGH ZERO CROSSING OF WAVEFORM |
|  | DEC C | ;DECREMENT TIKEOUT COUNTER DURING WAIT |
|  | JP Z,FBFAIL | ;JUMP TO FEEDBACK FAIL ROUTINE IF NO |
|  | RRA | ;ZERO CROSSING IN 2 MSEC |
|  | JR C,HIGH |  |
| WAIT | LD A,(HL) |  |
|  | DEC C |  |
|  | JP Z,FBFAIL |  |
|  | RRA |  |
|  | JR NC,WAIT |  |
|  | LD A,(CONTRL) | ;INPUT DATA FROM PORT 50 AND CHECK FOR A MINIMUM OF 2 VOLTS |
|  | AND 0BFH | ;P TO P OF FEEDBACK SIGNAL |
|  | JP Z,FBFAIL | ;JUMP TO FEEDBACK FAIL IF NOT 2 VOLTS |
|  | LD HL,(LATCH) | ;INPUT REFERENCE COUNT FROM LATCH 25 |
|  | EX DE,HL | ;STORE IN DE |
|  | LD B,E | ;SAVE LOWER 5 BITS OF DE |
|  | LD A,E |  |
|  | AND 0E0H | ;MASK OFF LOWER 5 BITS OF DE |
|  | LD E,A |  |
|  | LD HL,7CE$\phi$H | ;LOAD HL WITH EQUIV OF 999 SHIFTED LEFT |
|  | SBC HL,DE | ;5 PLACES AND SUB THE 11 BITS OF DE TO |
|  | EX DE,HL | ;GET STRAIGHT BINARY, SAVE IN DE |
|  | XOR A | ;CLEAR CARRY AND HL |
|  | LD H,A |  |
|  | LD L,A |  |
|  | LD A,(MOD) | ;GET MODULUS |
|  | LD C,A | ;SAVE IN C |
|  | RLCA |  |
|  | RLCA |  |
|  | RLCA |  |
| MULT | RR D | MULTIPLY TOP 11 BITS OF DE BY MODULUS |
|  | RR E |  |
|  | RLA |  |
|  | JR NC,MULT |  |
|  | ADD HL,DE | ;CLEARS CARRY ALSO |
|  | OR A |  |
|  | JR NZ,MULT |  |
|  | LD A,B | ;LOWER 5 BITS TO A |
|  | AND 1FH |  |
|  | ADD A,C | ;PERFORM (LOW 5 BITS) − (32 − MODULUS) |
|  | SUB 32D |  |
|  | LD E,A | ;STRAIGHT BINARY VALUE OF 5 BITS |
|  | LD D,00 |  |
|  | ADD HL,DE | ;ADD THIS TO HL TO GET TOTAL BINARY COUNT |
|  | RET | ;OF REFERENCE COUNTER AT ZERO CROSSING. |

REFERENCE CORRECTION SUBROUTINE

|  |  |  |
|---|---|---|
| REFCOR | LD, B00H | ;SET B REG FOR SINE SELECT BY ANALOG MUX |
|  | CALL RDLCH | ;GET VALUE OF REF, ZERO CROSSING |
|  | EX DE,HL | ;AND STORE IN DE |
|  | LD HL,(LSTREF) | ;GET OLD VALUE OF REF CROSSING |
|  | LD (LSTREF),DE | ;STORE NEW VALUE OF REFERENCE ZERO CROSSING |
|  | XOR A |  |
|  | SBC HL,DE | ;LAST REF − CURRENT REF TO DE |
|  | EX DE,HL |  |
|  | ADD IY,DE | ;CORRECT ACCUMULATED POSITION FEEDBACK FOR SINE WAVEFORM ZERO CROSSING DRIFT |
|  | RET |  |

QUADRATURE CORRECTION ROUTINE

|  |  |  |
|---|---|---|
| QUADCR | LD HL,(LSTREF) | ;GET LAST REF CROSSING COUNT |
|  | EX DE,HL |  |
|  | LD HL,(QUART) | ;GET NUMBER OF COUNTS FOR |

APPENDIX B-continued

|  |  |  |
|---|---|---|
|  |  | NEGATIVE 90 DEGREES |
|  | ADD HL,DE | ;EXPECTED QUAD CROSSING = REF − 90 DEGREES COUNT |
|  | PUSH HL | ;SAVE THIS ON STACK |
|  | LD B,01 | ;SET B REG FOR COSINE SELECT BY ANALOG MUX |
|  | CALL RDLCH | ;GET ACTUAL ZERO CROSSING OF COSINE INPUT WAVEFORM |
|  | POP DE | ;GET EXPECTED QUAD CROSS OFF STACK |
|  | XOR A | ;CLEAR CARRY |
|  | SBC HL,DE | ;QUAD ERROR = ACTUAL ZERO CROSSING COUNT − EXPECTED COUNT |
|  | RET Z | ;RETURN IF NO ERROR |
|  | LD A,(OUTIMG) | ;GET STATUS OF CONTROL LATCH 53 |
|  | LD B,A |  |
|  | LD DE,CONTRL |  |
|  | JR C,LOOP2 | ;IF QUAD ERROR POSITIVE, GO TO LOOP 2; |
| LOOP 1 | LD A,B | ;SET BIT 4 TO GENERATE LOGIC HIGH ON LINE 68 TO COUNTER |
|  | OR 18H | ;PULSE BIT 3 (line 67) TO SUBTRACT THE NUMBER |
|  | LD (DE),A | ;CLOCK PULSES FROM REF COUNTER EQUAL |
|  | AND 0EFH | ;TO NUMBER OF POSITIVE ERROR |
|  | LD (DE),A | ;COUNTS |
|  | DEC HL |  |
|  | LD A,L |  |
|  | OR H |  |
|  | JR NZ,LOOP1 |  |
|  | RET |  |
| LOOP 2 | LD A,B | ;RESET BIT 4 TO GENERATE LOGIC LOW ON LINE 68 |
|  | AND 0F7H | ;PULSE BIT 3 TO SUBTRACT THE NUMBER OF |
|  | OR 10H | ;CLOCK PULSES FROM THE COSINE WAVEFORM DELAY COUNTER EQUAL |
|  | LD (DE),A | ;TO THE NUMBER OF |
|  | AND 0EFH | ;NEGATIVE ERROR COUNTS |
|  | LD (DE),A |  |
|  | INC HL |  |
|  | LD A,L |  |
|  | OR H |  |
|  | JR NZ,LOOP2 |  |
|  | RET |  |

AMPLITUDE CORRECTION ROUTINE

|  |  |  |
|---|---|---|
| ; |  |  |
| AMPCOR | LD HL,(LSTREF) | ;GET REFERENCE CROSSING COUNT |
|  | EX DE,HL |  |
|  | LD HL,(EIGHT) | ;GET NUMBER OF COUNTS REPRESENTING 45° |
|  | EX DE,HL |  |
|  | XOR A |  |
|  | SBC HL,DE | ;EXPECTED CROSSING = REF − 45 DEGREES |
|  | PUSH HL | ;SAVE ON STACK |
|  | LD B,03 | ;SET B REG FOR SINE+COSINE SELECT BY ANALOG MUX |
|  | CALL RDLCH | ;GET ACTUAL CROSSING OF SINE+ COSINE WAVEFORM |
|  | POP DE | ;GET EXPECTED ZERO CROSSING OFF STACK |
|  | XOR A |  |
|  | SBC HL,DE | ;ERROR = ACTUAL − EXPECTED CROSSING |
|  | RET Z | ;IF NO ERROR,RETURN |
|  | LD A,(AMPIMG) | ;GET CURRENT SETTING OF D/A CONVERTER 84 |
|  | LD B,A |  |
|  | JP P,POSERR | ;IF ERROR IS POSITIVE JUMP, OTHERWISE |
| NEGERR | DEC B | ;INCREASE CURRENT TO D/A 31 TO INCREASE |
|  | DEC B | ;AMPLITUDE OF SINE WAVEFORM AT RESOLVER |
|  | INC HL |  |
|  | LD A,L | ;DO THIS UNTIL ERROR COUNTED TO ZERO |
|  | OR H |  |
|  | JR NZ,NEGERR |  |
|  | JR AMPOK |  |
| POSERR | INC B | ;DECREASE CURRENT TO D/A 31 |

APPENDIX B-continued

```
                         TO DECREASE SINE WAVEFORM
        INC B
        DEC HL           ;DO UNTIL ERROR COUNTED TO
                          ZERO
        LD A,L
        OR H
        JR NZ,POSERR
AMPOK   LD A,B           ;OUTPUT NEW AMPLITUDE VALUE
                          TO D/A 84
        LD (AMPDAC),A    ;THROUGH LATCH 54
        LD (AMPING),A    ;STORE IMAGE OF NEW DAC
                          VALUE IN MEMORY 60
        RET
;
```

We claim:

1. A servo drive circuit which employs a resolver-type position feedback transducer, the combination comprising:

reference generation means for generating data indicative of the phase of a periodic wave form;

first wave form generation means coupled to the reference generation means and operable to generate a first periodic wave form which is applied to the resolver-type position feedback transducer which has a first preselected phase relationship with said generated data;

second wave form generation means coupled to the reference generation means and operable to generate a second periodic wave form which is applied to the resolver-type position feedback transducer which has a second preselected phase relationship with said generated data;

phase detection means coupled to one of said wave form generation means and being operable to generate data indicative of the phase of said one periodic wave form;

phase altering means coupled to one of said wave form generation means for altering the phase of its generated periodic wave form in response to phase correction data; and processor means coupled to said phase detection means to receive its generated data, coupled to said reference generation means to receive its generated data, and coupled to generate phase correction data to said phase altering means, said processor means being operable to periodically measure the phase of one of said periodic wave forms and determine its phase relationship with respect to said reference generation means data, and being operable to generate correction data to said phase altering means for maintaining a preselected phase relationship between said first and second periodic wave forms.

2. The servo drive circuit as recited in claim 1 which includes:

summing means connected to receive said first and second periodic wave forms and generate a third periodic wave form the phase of which indicates the relative amplitudes of the first and second periodic wave forms;

amplitude correction means coupled to one of said wave form generation means and being operable in response to amplitude correction data to alter the amplitude of its generated periodic wave form; and said processor means is coupled to said summing means and said amplitude correction means and it is operable to periodically measure the phase of said third periodic wave form, and in response to the results of this measurement, generate amplitude correction data to said amplitude correction means which maintains the relative amplitudes of said first and second periodic wave forms at a preselected relationship.

3. The servo drive circuit as recited in claim 1 in which said preselected phase relationship between said first and second periodic wave forms is one quarter of a period of one of said periodic wave forms.

4. The servo drive circuit as recited in claim 2 in which the relative amplitudes of said first and second periodic wave forms are preselected to be equal.

5. The servo drive circuit as recited in claim 2 in which said phase detection means includes an analog multiplexer which connects to said one of said wave form generation means and to said summing means, and which is connected to said processor means and responsive to data generated thereby to select either said one periodic wave form or said third periodic wave form for measurement.

6. The servo drive circuit as recited in claim 5 in which said analog multiplexer also connects to receive a periodic feedback wave form generated by said transducer, and said processor means is operable to select said periodic feedback wave form and measure its phase.

7. The servo drive circuit as recited in claim 6 in which said analog multiplexer also connects to the other of said wave from generation means to receive the periodic wave form which it generates, and said processor means is operable to select said other periodic wave form to measure its phase, and in response thereto, generate phase correction data to said phase altering means.

8. The servo drive circuit as recited in claim 1 in which said reference generation means includes a digital counter that is continuously cycled to its maximum count and the phase of said one periodic wave form is measured by reading the count in said digital counter when said one periodic wave form reaches a preselected voltage in its cycle.

9. The servo drive circuit as recited in claim 8 in which a periodic feedback wave form is received from said transducer and its phase is measured by reading the count in said digital counter when the periodic feedback wave form reaches a preselected voltage in its cycle.

* * * * *